UNITED STATES PATENT OFFICE.

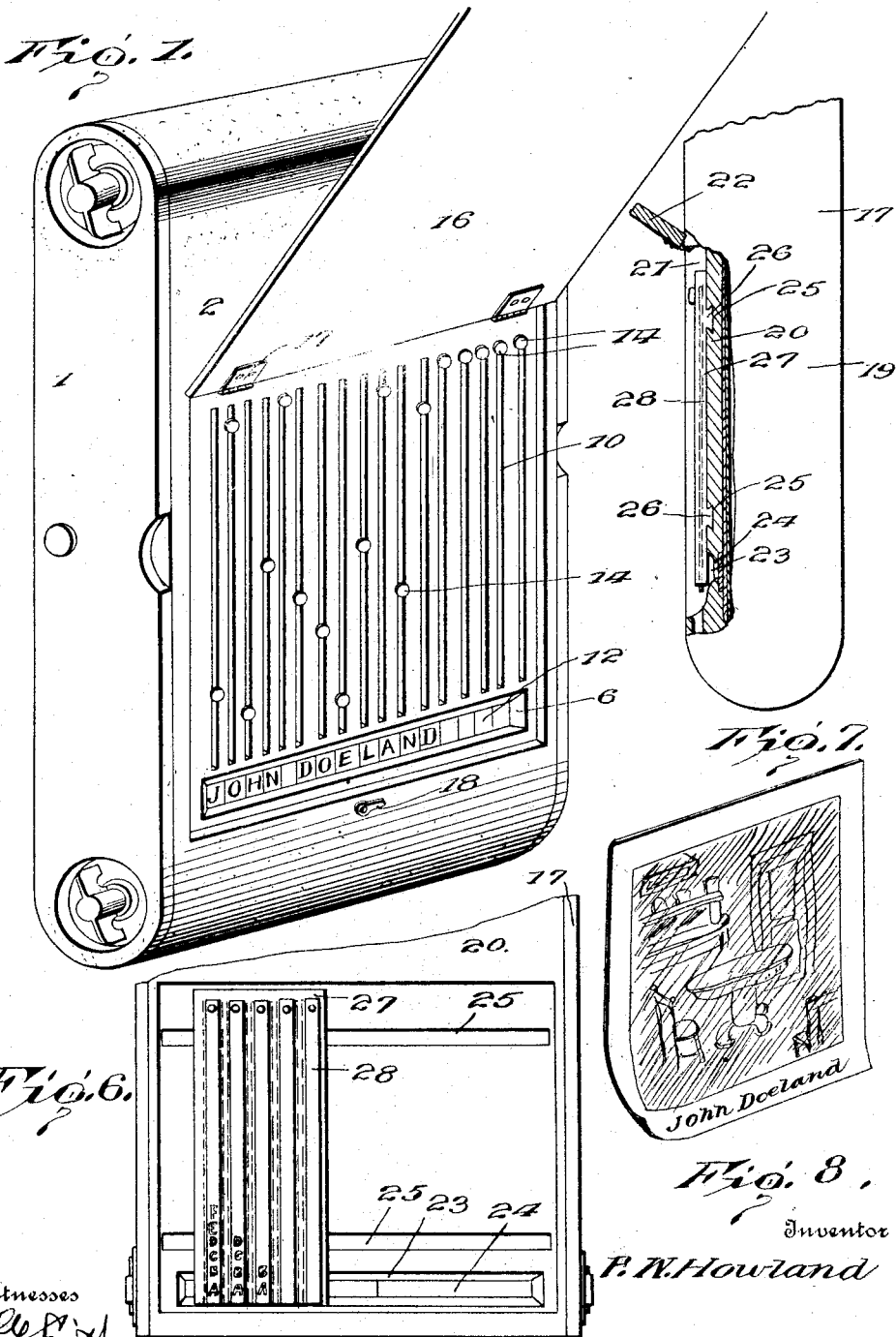

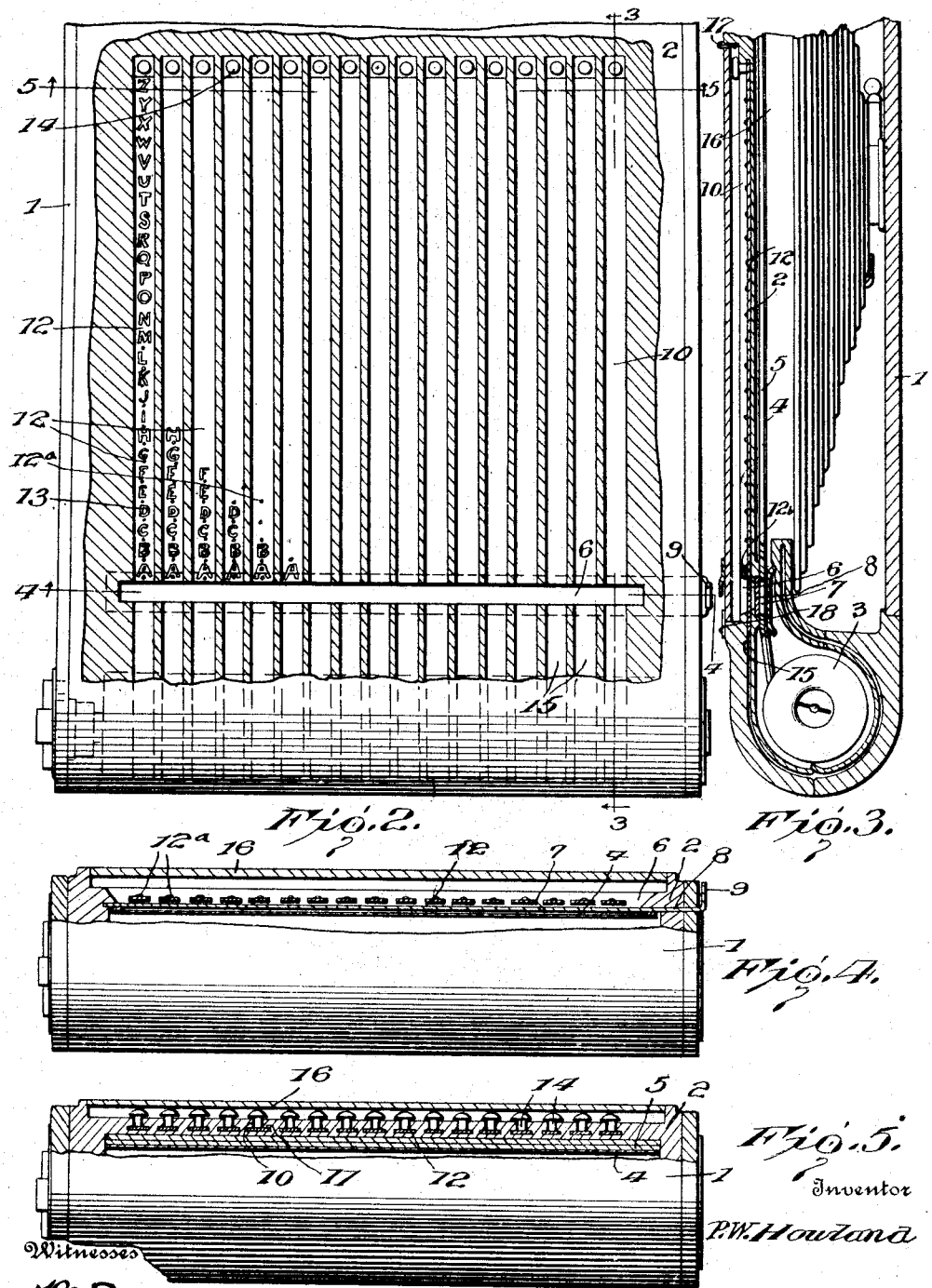

PAUL WM. HOWLAND, OF HOUGHTON, WASHINGTON.

EXPOSURE-IDENTIFYING DEVICE FOR CAMERAS.

1,210,804.                Specification of Letters Patent.       Patented Jan. 2, 1917.

Application filed April 6, 1915. Serial No. 19,518.

*To all whom it may concern:*

Be it known that I, PAUL WM. HOWLAND, a citizen of the United States, residing at Houghton, in the county of King and State of Washington, have invented certain new and useful Improvements in Exposure-Identifying Devices for Cameras, of which the following is a specification.

This invention relates to exposure identifying devices for cameras, and has as its object to provide, in combination with any ordinary camera, means whereby the title of each picture or exposure, or some other legend or data relating thereto, may be directly printed photographically upon the film or plate immediately after the exposure has been made so that when the film or plate has been developed it will bear the desired identification, which identification will appear also upon the proofs printed from the negative.

Another aim of the invention is to so construct the device that practically any desired arrangement of letters and words may be obtained in the use thereof.

Another aim of the invention is to so construct the device that it will not add to an appreciable extent to the bulk of the camera and which, when not in use, will be hidden from view.

Another aim of the invention is to so construct the device that its use will not be liable to result in blurring or overexposure of the sensitized film or plate.

In the accompanying drawings: Figure 1 is a perspective view of a well known form of camera equipped with the device embodying the present invention. Fig. 2 is a rear elevation of the structure shown in Fig. 1, parts being shown in section. Fig. 3 is a vertical transverse sectional view on the line 3—3 of Fig. 2. Fig. 4 is a horizontal sectional view on the line 4—4 of Fig. 2. Fig. 5 is a similar view on the line 5—5 of Fig. 2. Fig. 6 is a view similar to Fig. 2 illustrating a slight modification of the invention. Fig. 7 is a vertical transverse sectional view therethrough. Fig. 8 is a view illustrating a proof printed from a negative marked with identifying means by the use of the devices embodying the present invention.

Corresponding and like parts are referred to in the following description and indicated in all the views of the accompanying drawings by the same reference characters.

That portion of the device which is employed for the purpose of printing letters and words, or in other words, making photographic impressions thereof upon the film, consists, generally speaking, of a number of strips which may be of opaque material and which have stamped in them letters of the alphabet and any other desired characters, or which may be transparent and have such opaque letters and characters printed or otherwise marked thereon, the strips being movable or adjustable independently of one another and with respect to an exposure slot or opening in the back of the camera, in connection with which the device is used, so that the desired letter combinations may be produced and a photographic impression thereof made upon the film or sensitized plate upon the passage of light through said exposure slot or opening.

In Figs. 1 to 5 inclusive of the drawings, there is illustrated one form of the device embodying the present invention and in these figures the numeral 1 indicates a well known type of folding film camera, the back of the camera casing being indicated by the numeral 2. The usual film spools 3 are mounted within the casing and the film is indicated by the numeral 4 and is provided with the usual backing strip 5 of black and opaque paper. As usual, as successive portions of the film are brought into position for exposure, these portions are held flat against the back of the camera casing. The strips above mentioned are mounted in a manner to be presently explained within the recessed back of the casing and are adjustable with relation to an exposure slot 6 which is formed in the said back and past which the film travels as successive portions are brought into position for exposure. Inasmuch as the backing 5 of the film is located next to the inner face of the back 2 of the camera casing, this backing is formed at intervals with slots or openings 7 of a suitable size so that a photographic impression may be made upon the film through the said exposure opening 6. In order that when the device is not in use the sensitized film may be protected from the light, a slide shutter 8 is mounted for movement longitudinally of the exposure slot 6 and normally closes the said slot, this shutter being provided at one end, exteriorly of the camera casing, with a finger piece 9 by means of which it may be moved for the purpose of exposing a greater or less portion of the length of the said exposure slot. The camera back 2 is formed with a transversely extending series of grooves 10 which extend vertically and which are arranged in parallel relation with respect to each other. These grooves 10 have undercut side walls forming guide grooves 11. As before stated, strips are employed carrying letters of the alphabet and other characters and one of these strips is arranged in each of the grooves 10 with its lateral edges projecting into and guided by the grooves 11.

The strips are indicated by the numeral 12 and the letters or characters cut therein are indicated by the numeral 13. As above pointed out, these strips may be of opaque material and the characters may be cut therein or the strips may be of transparent or semitransparent material and the characters may be opaque. Each strip is provided at its upper end with a finger knob 14 and by grasping any one of these knobs, the corresponding strip may be moved vertically up or down within its respective groove so as to bring one or another of the characters thereon opposite the exposure slot 6. The lower ends of the strips 12 extend vertically across the slot 6 and fit into channels 15 formed in the back and one end of the camera casing, these channels being of such length as to permit of the strips being moved to bring any character carrying portion of their length opposite the exposure opening. While I have found this to be the most convenient arrangement for temporarily storing the lower end portions of the strips, it will be understood that if desired the strips may be allowed to project at their said portions below the lower end of the camera casing, thereby dispensing with the channels 15. The camera back preferably has its rear face recessed as shown in Figs. 1 and 2 of the drawings so as to house the parts just described and to avoid adding to any appreciable extent to the bulk of the camera, and when not in use the recess is closed by means of a door 16 hingedly mounted as at 17 and held closed by means of a latch or other suitable device 18.

In order that the strips 12 may be held at adjustment and so that the letters formed in these strips will be in exact alinement longitudinally of the exposure slot 6, each strip is formed between the letters or other characters thereon with small rounded protuberances 12$^a$ designed to successively engage in a shallow groove 12$^b$ formed in the wall of the camera casing immediately above the exposure slot 6, as the strips 12 are slid upwardly or downwardly.

After an exposure has been made in the usual manner and it is desired to photographically impress an identifying legend or the like upon the sensitized film, the door 16 is swung open and the strips 12 are successively adjusted so as to compose the word or words desired, this being accomplished by successively bringing the letters composing the words opposite the exposure slot 6. After the desired words have in this manner been composed, the shutter 8 is withdrawn a sufficient distance to expose the composed words to the light rays passing through the letter apertures in the strips. After an exposure of the proper duration has been made the shutter 9 is again slid to closed position and the door 16 is closed. The film may then be advanced to position for making the next exposure.

In that form of the invention shown in Figs. 6 and 7 of the drawings, the camera casing is indicated by the numeral 17 and the back thereof by the numeral 20, this back being recessed in its rear face as at 21 and provided with a hinged closure door 22, corresponding to the door 16. The back 20 is provided with an exposure slot 23 past which the film is to be moved and with slide shutters 24, corresponding to the shutter 8. The recessed rear face of the back 20 is provided with transversely extending parallel dove-tailed grooves 25 and in these grooves are slidably fitted dove-tail ribs 26 extending transversely of a plate 27 which carries a number of strips 28, corresponding to the strips 12, the plate being formed with guide grooves, corresponding to the grooves 10 and 11. The engagement of the ribs 26 in the grooves 25 serves to permit of the plate 27 being shifted transversely of the camera back and by reason of this arrangement the strips may be adjusted so as to compose a word located opposite the exposure slot 23 and the shutters 24 may be adjusted so as to permit light rays to pass through the letters composing the word and to the sensitized film. After this has been done, the shutters may be so adjusted as to entirely close the exposure slot and another word may be composed by adjusting the strips, after which the plate 27 is shifted so as to properly position the new word or words so that they will immediately follow the word or words previously photographically printed, and the shutters are again so relatively adjusted as to uncover that portion of the exposure slot opposite which the new word or words are located. It will be observed that the shutters 24 are arranged in overlapped relation and may be independently adjusted so as to uncover any desired portion of the length of the exposure-slot.

Having thus described the invention, what is claimed as new is:

1. In a device of the class described, the combination with a camera casing having an exposure opening in one wall thereof, of a plurality of strips having character perforations therein, the said strips being slidably mounted and all arranged for adjustment across the said opening whereby compositions of characters may be produced at the opening, and means for closing the opening.

2. In a device of the class described, the combination with a camera casing having a transversely extending opening in one wall thereof, of a plurality of guides extending above and below the said opening, and character carrying members slidably mounted in the guides and arranged for adjustment across the said opening whereby compositions of characters may be produced at the opening.

3. In a device of the class described, the combination with a camera casing having an exposure opening in one wall thereof, of a plurality of character carrying strips slidably movable upon the said wall of the casing and across the opening whereby compositions of characters may be produced at the opening, and means upon the said strips and upon the said wall arranged to coöperate to hold the strips in positions of adjustment with selected characters opposite the said opening.

4. In a device of the class described, the combination with a camera casing having an exposure opening in one wall thereof, of a plurality of character carrying strips slidably movable upon the said wall of the casing and across the opening whereby compositions of characters may be produced at the opening, and means upon the said strips and upon the said wall arranged to coöperate to hold the strips in positions of adjustment with selected characters opposite the said opening, the said means comprising projections upon the said strips and a member having means for coöperation with the said projections.

5. In a device of the class described, the combination with a camera casing having an exposure opening in one wall thereof, of a series of guides within the said wall transecting the opening, character carrying strips mounted in the guides for sliding movement across the opening whereby a composition of characters may be produced at the opening, and means whereby the strips may be independently adjusted.

6. In a device of the class described, the combination with a camera casing having an exposure opening in one wall thereof, of a series of guides within the said wall transecting the opening, character carrying strips mounted in the guides for sliding movement across the opening whereby compositions of characters may be produced at the opening, and a shutter movable across the said opening.

In testimony whereof I affix my signature in presence of two witnesses.

PAUL WM. HOWLAND. [L. S.]

Witnesses:
 E. H. WINDSER,
 R. O. WORTHINGTON.

Copies of this patent may be obtained for five cents each, by addressing the "Commissioner of Patents, Washington, D. C."